United States Patent [19]

Hake

[11] 4,220,211
[45] Sep. 2, 1980

[54] HARROW WITH TINE STOP THEREFOR

[75] Inventor: Kenneth A. Hake, Tipton, Kans.

[73] Assignee: Kent Manufacturing Company, Inc., Tipton, Kans.

[21] Appl. No.: 914,849

[22] Filed: Jun. 12, 1978

[51] Int. Cl.² ............................................. A01B 19/02
[52] U.S. Cl. .................................... 172/618; 172/198; 172/643
[58] Field of Search ............... 172/142, 198, 389, 390, 172/391, 449, 618, 620, 621, 622, 634, 635, 636, 637, 638, 639, 643, 683, 706, 707, 712, 748

[56] References Cited

U.S. PATENT DOCUMENTS

| 256,619 | 4/1882 | Barley | 172/618 |
|---|---|---|---|
| 427,412 | 5/1890 | Frazier | 172/618 |
| 639,813 | 12/1899 | Jerdee | 172/712 |
| 2,805,613 | 9/1957 | Siems | 172/643 |
| 3,016,958 | 1/1962 | Knapp et al. | 172/639 |
| 3,049,184 | 8/1962 | Lohrman | 172/707 |
| 3,223,177 | 12/1965 | van der Lely | 172/449 |
| 3,245,479 | 4/1966 | Dlugosch et al. | 172/635 |
| 3,532,171 | 10/1970 | Kasten | 172/198 X |
| 3,774,694 | 11/1973 | Gates | 172/643 X |
| 3,976,145 | 8/1976 | Blair | 172/198 X |

Primary Examiner—Richard T. Stouffer
Attorney, Agent, or Firm—Fishburn, Gold and Litman

[57] ABSTRACT

In a farm harrow, a U-shaped clamp mounts channel-shaped bars to harrow tine supporting shafts. The shafts transversely extend through longitudinal channel-shaped carrier arms and are rotatably mounted therethrough. The bars are mounted within each respective carrier arm channel and introduce, in cooperation with the carrier arm, rotative limits to the respective shafts. The bars allow the rotative limits of the respective shafts to be adjusted accordingly so as to maintain a desired drag angle for the attached harrow teeth during forward harrow movement as well as allowing the harrow to back up without the attached harrow teeth digging in.

13 Claims, 6 Drawing Figures

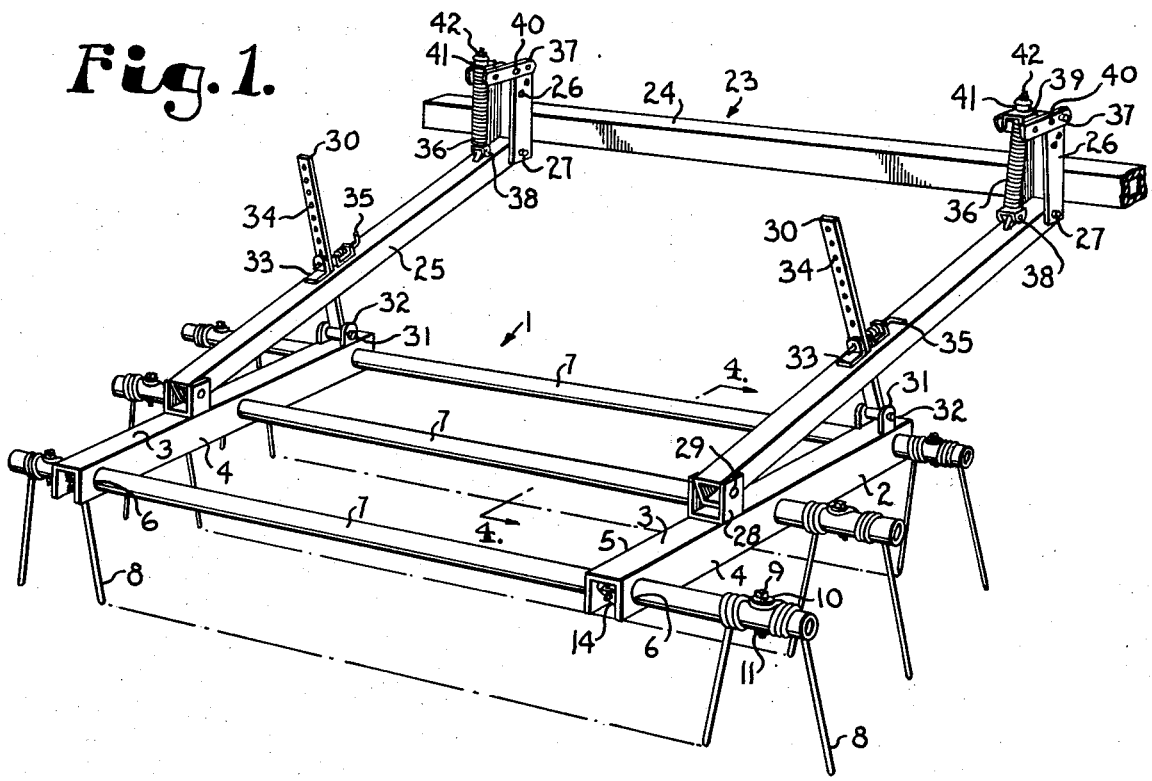
Fig.1.
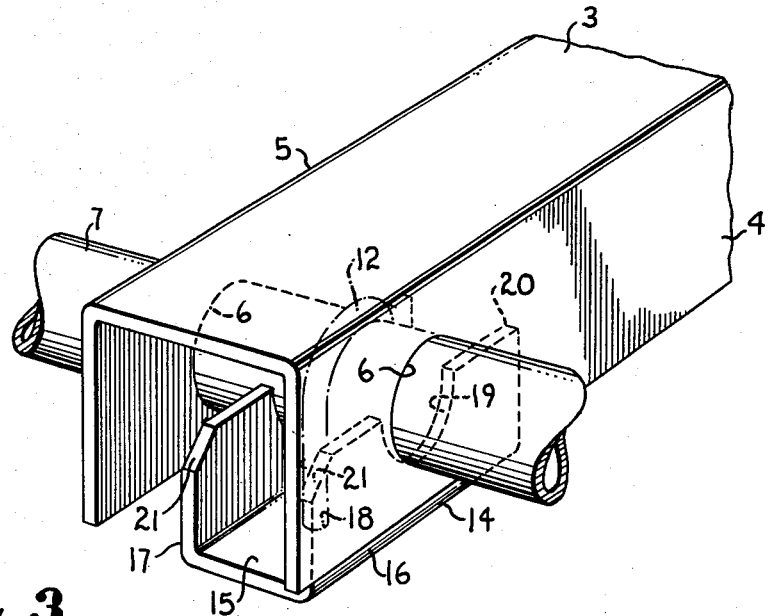
Fig.2.
Fig.3.

HARROW WITH TINE STOP THEREFOR

The present invention relates to finishing harrows, and more particularly to a harrow structure so designed as to maintain desirable positioning of the harrow teeth during forward or backward harrow movement.

BACKGROUND OF THE INVENTION

In recent years, the design of agricultural implements has emphasized improvements so as to reduce tillage time. Seeking efficiency, it is desirable in harrows to have the capability to optimally position the angle of the harrow teeth, whether coil tine or spike tooth, according to soil conditions and to maintain this angle during harrow use. Also desirable is the elimination of digging in of these harrow teeth with resulting stresses when the harrow is pulled around a sharp curve or backed up without the harrow teeth being lifted from a terrain contacting position.

Previous devices have addressed adjustment of the drag angle of harrow teeth by providing means for swingably connecting the harrow teeth between a vertical position and an angled position, but an inherent feature of these devices is the necessity to provide for changing the application of the pulling forces from the harrow front to rear, or vice-versa, depending on the desired position of the harrow teeth.

Other devices use relatively complex locking means to hold the harrow teeth in a vertical position. However, such devices, aside from their relative complexity of use, lock the teeth in one position and do not address the digging in of the harrow teeth or the necessity to angularly adjust the harrow teeth according to varying soil conditions.

Other devices have addressed the backup problem by introducing rotation to the harrow teeth supporting bars and the connected teeth themselves. However, limitations are found in the range of the drag angle adjustment of the harrow teeth and in the rotation of the bars themselves. When such devices allow complete rotation during harrow movement, the harrow teeth are allowed to go beyond optimal angle positions which led to buckling or bending of the harrow teeth, and/or complete disengagement of the harrow teeth from their functional terrain contacting position.

The present invention introduces a harrow of novel design which introduces a wide and variable range to harrow teeth angular adjustment as well as the maintenance of the desired drag angle of the harrow teeth and limitation thereto during forward harrow movement. Also introduced are rotative capabilities to the harrow teeth supporting shafts and attached harrow teeth so as to allow the harrow to back up without the teeth digging in.

SUMMARY OF THE INVENTION

In the practice of this invention, a harrow, attached to a general implement frame, is designed to have tubular harrow teeth supporting shafts transversely and rotatively mounted through longitudinal channel-shaped carrier arms. An angle, relative to the terrain, called the drag angle is selected for the coil tines or spiked teeth attached to the shafts. The shafts are rotated so that these attached tines are positioned at the desired drag angle.

Within each carrier arm channel, a U-shaped bolt is positioned around each respective shaft with the free ends of the bolt projecting through the web surface of a channel-shaped bar functionally called a braking bar. This bar has beveled corners at the rearward free edges of its vertical flanges and a semi-circular notch cut into these vertical free edges which defines the shaft circumference. The braking bar is positioned so as the notch periphery lies contiguous to the shaft with the beveled corners abutting the interior surface of the central web of the carrier arm. The braking bar is secured in this position by functionally engaging and tightening threaded nuts to the threaded free ends of the bolt. The beveled surface to web surface contact limits counter-clockwise rotation of the harrow teeth supporting shafts and thus restricts the attached teeth to the chosen drag angle during forward harrow movement. When backing up, the tine support shafts rotate clockwise allowing the harrow teeth to swingably rotate counter the direction of movement, preventing digging in of the attached harrow teeth. The braking bar positioned within the carrier arm channel also restricts significant transverse movement of the shafts along their respective lateral axes.

It is an object of the present invention to provide a harrow which is simple and inexpensive to construct and efficient in operation. Another object of the present invention is to provide a harrow with omni-directional movement without the necessity of raising the harrow teeth from their terrain contacting position. Still another object of the present invention is to provide a harrow so constructed as to reduce teeth breakage and/or distortion during omni-directional movement permitting a wider freedom of harrow use. A still further object of this invention is to provide a harrow with a wide range of harrow teeth drag angle adjustment, which angle can be simply maintained during forward harrow movement. Still another object of this invention is to provide a harrow with a harrow teeth support shaft arrangement by which significant lateral movement of the support shafts are restricted.

Other objects and advantages of this invention will become apparent from the following description taken in connection with accompanying drawings, wherein are set forth by way of illustration and example, certain embodiments of this invention.

BRIEF DESCRIPTION OF THE DRAWINGS

FIG. 1 is a perspective view of a coil tine finishing harrow constructed according to the present invention and attached to a general implement frame.

FIG. 2 is a fragmentary perspective view showing a harrow teeth supporting shaft equipped with spike teeth, extending through a carrier arm.

FIG. 3 is a fragmentary perspective view, on an enlarged scale, showing details of a carrier arm, harrow teeth supporting shaft and U-bolt arrangement.

DESCRIPTION OF THE PREFERRED EMBODIMENTS

Figure 4:
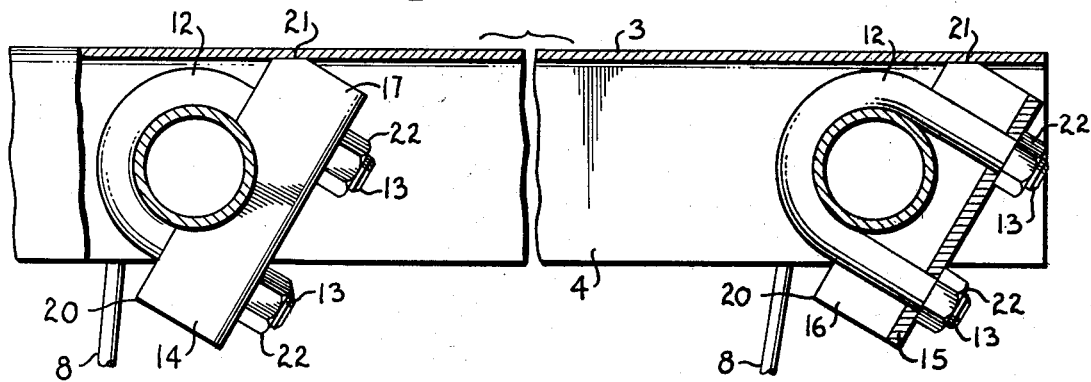
FIG. 4 is a fragmentary vertical sectional view, along line 4—4 in FIG. 1, showing the braking bars in functional engagement with a harrow carrier arm during forward harrow movement.

The harrow 1 comprises generally horizontal carrier arms 2 extending rearwardly from a general implement frame 23. The carrier arms 2 are channel-shaped having a central web 3 spanning downward vertical flanges 4 and 5. The carrier arm flanges 4 and 5 have congruent circular apertures 6, spaced and axially aligned so as to receive transversely extending harrow teeth supporting shafts 7. The concentric apertures 6 are of such a diameter as to allow shaft reception and projection while restricting shaft movement to rotation about its axis.

The harrow teeth supporting shafts 7 are preferably tubular in construction with harrow teeth spaced therealong. As shown in FIG. 1, coil tines 8 are used as harrow teeth and are attached to the shafts 7 by means of a bolt 9, washer 10 and nut 11 functional engagement. In the interest of optimal harrow use the method of coil tine mount should be identical among the several coil tines 8 on each respective shaft 7 so as to allow easier drag angle adjustment in a manner to be subsequently discussed.

A U-shaped bolt 12 having threaded free ends 13 is designed to be positioned about the respective shafts 7 within the channel of the respective carrier arms 2 without interference with shaft rotation. The bolt 12 is used to mount a channel-shaped bar 14, functionally called a braking bar, to the shaft 7. The braking bar 14 is also channel-shaped, having a central web 15 spanning upward vertical flanges 16 and 17. Apertures 18 are located within the braking bar web 15 so as to allow projection of the bolt free ends 13 through the braking bar web 15 with subsequent engagement of nuts 22 thereto. Concentric semicircular notches 19 are medially located along the free edges of the braking bar vertical flanges 16 and 17. The notches 19 define the shaft periphery so that the notches 19 will lie contiguous to the shaft 7 when the braking bar 14 is in its mounted position. The free vertical and horizontal edges of the flanges 16 and 17 form front corners 20 and rear corners 21. The rear corners 21 of the braking bar vertical flanges 16 and 17 are preferably beveled so as to provide a greater surface contact between these corners and the interior surface of the carrier arm central web 3, the purpose of which is to be subsequently discussed. The braking bar 14 is of such overall dimensions so as to be positioned within the channel of the carrier arms 2 with no incidental contact between the braking bar 14 and the interior surface of the carrier arm 2.

The harrow 1 is attached to a general implement frame 23 as shown in FIG. 1. The frame 23 has a mounting bar 24 transversely attached to the pulling device (not shown). Implement frame mounting arms 25 extend rearwardly from the mounting bar 24 and are pivotally attached to the mounting bar 25 by means of pin members 27, extending through the arms 25 and mounting bar brackets 26. The mounting arms 25 are pivotally attached to the harrow carrier arms 2 by means of pin members 29 extending through the mounting arms 25 and carrier arm brackets 28.

The longitudinal cant of the harrow 1 is adjusted by means of leveling arms 30 pivotally attached to the carrier arms 2 by means of pin members 32 extending through the leveling arms 30 and leveling arm brackets 31 located on the carrier arms 2. The free ends of the leveling arms 30 project through slots in the implement frame mounting arms 25. The desired cant, once chosen, is achieved by varying the projection of the leveling arms 30 through the mounting arms 25. This cant is maintained by means of pin members 35 extending through leveling arm brackets 33, located on the mounting arms 25, and through apertures 34, located along the length of the leveling arm 30. The apertures 34 chosen will vary according to the desired cant.

Downward pressure on the mounting arms 25 is maintained by springs 36, located between the mounting bars 25 and the spring brackets 39. One end of each respective spring 36 is urged downwardly against a bracket 38 pinned to the mounting arm 25 with the opposite end engaging the bracket 39 which is pivotally mounted between legs of yokes 37. Yokes 37 are pivotally mounted to the mounting bar brackets 26 for adjustment about an axle pin 40. By pinning the yokes in a selected angular position the compression of the respective springs 36 can be suitably adjusted so as to vary the drag or pressure of the coil tines 8 on the terrain from a heavy drag to complete disengagement of the coil tines 8 from their terrain contacting position. Upon lifting of the bars 25 by the yokes 37, the weight of the bars is supported on resilient washers 41 beneath adjusting nuts 42.

Another embodiment of the invention is shown in FIG. 2, in which the coil tines 8 are replaced with spike teeth 42. The harrow 1 so equipped, can be used as subsequently described with the same accruing advantages and results.

OPERATION

It is desirable at times to operate the harrow 1 with the coil tines 8 in a generally vertical position as when increased soil penetration is desired. At other times, it may be necessary to have the tines 8 extend towards the rear of the harrow as when operating in trashy soil conditions. The position of the tines 8 relative to the terrain is designated as the drag angle.

Once the desired drag angle is chosen, the following steps are taken prior to harrow use:

Step 1.

The respective harrow teeth supporting shafts 7 are rotated so that the tines 8 spaced along each respective shaft are positioned at the chosen drag angle.

Step 2.

Within each respective carrier arm channel the U-bolt 12 is placed about each shaft.

Step 3.

The threaded free ends 13 of the U-bolt 12 are inserted through the braking bar apertures 18. Threaded nuts 22 loosely engage the threaded free ends 13 at this time.

Step 4.

The semicircular notches 19 of the braking bar 14 are placed contiguous to the shaft 7. Concurrently, the beveled corners 21 of the braking bar 14 are positioned so as to abut the interior surface of the carrier arm central web 3.

Step 5.

The loosely engaged nuts 22 are now tightened, mounting the braking bar 14 in this position.

Step 6.

Steps 1–5 are then repeated for every braking bar 14 to be mounted on the respective shaft 7.

Step 7.

The cant and drag pressure on the coil tines 8 can now be adjusted accordingly by means of the leveling arms 30, mounting brackets 26 and related structure described above.

As the harrow 1 is moving forward, resulting forces upon the extremities of the terrain contacting coil tine 8, causes the supporting shafts 7 to rotate in a counter-clockwise direction. As shown in FIG. 4, the beveled corners 21 function as a braking surface against the carrier arm central web 3, restricting shaft rotation so that the attached coil tines 8 will be limited to the chosen drag angle, thus assuring the desired soil penetration.

Figure 5:
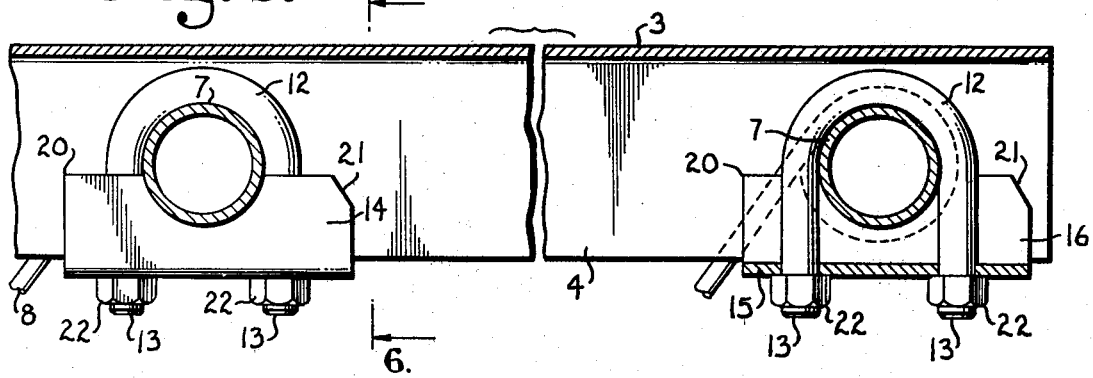
FIG. 5 is a fragmentary vertical sectional view, similar to FIG. 4, showing the position of braking bars during backward harrow movement.
Figure 6:
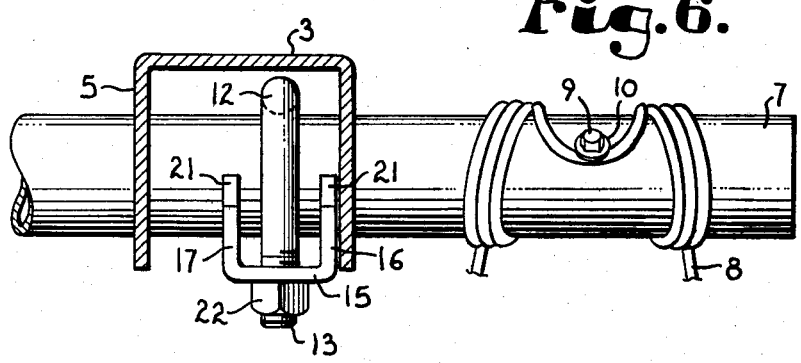
FIG. 6 is a fragmentary vertical sectional view taken along line 6—6 in FIG. 5.

As the harrow 1 is backing up, resulting forces upon the extremities of the terrain contacting coil tines 8 causes the supporting shafts 7 to rotate in a clockwise direction as shown in FIG. 5. The attached coil tines 8 will concurrently rotate counter the direction of harrow movement disengaging the braking surface contact so that the reverse drag on the tines 8 will be substantially reduced, avoiding the digging in of the coil tines 8. If clockwise rotation is sufficient, the corners 20 will contact the web 3, preventing further rotation; however, normally rotation to this extent will not occur because the carrier arms 2 will be supported above ground contact by the bar brackets 26 and adjacent structure.

As the harrow 1 is dragged around a sharp curve, some of the coil tines 8 may be backing up while others are advancing around the curve. During such instances the braking bars 14 mounted on the respective shafts 7 will variously function as above described, allowing the attached coil tines 8 to be positioned accordingly.

During the above described harrow movements, it is also noted that the positioning of the braking bars 14 within the carrier arm channels also restricts significant lateral movement of the supporting shafts 7 resulting in more efficient function of the attached tines 8.

It is to be understood that while certain forms of this invention have been illustrated and described, it is not to be limited thereto, except in so far as such limitations are included in the following claims.

What I claim and desire to secure by Letters Patent is:

1. A farm harrow comprising:
   (a) at least two draw carrier arms adapted for mounting to an implement frame and extending longitudinally in the direction of motion thereof, said respective carrier arms each having a contact surface;
   (b) a plurality of shafts spaced along the longitudinal extent of said arms, each of said shafts having a plurality of harrow teeth supported thereon;
   (c) a plurality of bearing means rotatively mounting said respective shafts to said carrier arms, said bearing means being spaced along the longitudinal extent of said carrier arms and associated therewith, said mounted shafts extending transversely of said carrier arms;
   (d) a plurality of brake means for limiting respective shaft rotation in one direction during normal harrow function and permitting free rotation through an angle in the opposite direction during back-up, said brake means each being mounted on one of said shafts next to said contact surface of one of said carrier arms, said brake means each having a braking surface contacting said adjacent carrier arm surface during said normal harrow function; and
   (e) clamp means mounting said brake means to said respective shafts, said clamp means including release members selectively releasable for permitting angular adjustment of said brake means about said respective shafts, whereby a plurality of desired harrow teeth drag angles are obtainable without interference with said free shaft rotation during back-up.

2. A farm harrow as set forth in claim 1, wherein:
   (a) said shafts are tubular in construction.

3. A farm harrow as set forth in claim 1, wherein:
   (a) said harrow teeth are coil tines.

4. A farm harrow as set forth in claim 1, wherein:
   (a) said harrow teeth are spiked teeth.

5. A farm harrow as set forth in claim 1 wherein:
   (a) at least one vertical flange extends from said contact surface, and
   (b) said bearing means comprises a circular aperture located in said vertical flange.

6. The farm harrow as set forth in claim 5 wherein:
   (a) said vertical flange extends downwardly from said contact surface.

7. The farm harrow as set forth in claim 4 wherein:
   (a) two vertical flanges extend downwardly from said contact surface forming an inverted channel therebetween, and
   (b) said brake means are located in said channel.

8. A farm harrow comprising:
   (a) at least two draw carrier arms adapted for mounting to an implement frame and extending longitudinally in the direction of motion thereof, said respective carrier arms each having a generally horizontal surface;
   (b) a plurality of shafts spaced along the longitudinal extent of said arms, each of said shafts having a plurality of harrow teeth supported thereon;
   (c) a plurality of bearing means rotatively mounting said respective shafts to said carrier arms, said bearing means being spaced along the longitudinal extent of said carrier arms and associated therewith, said mounted shafts extending transversely of said carrier arms;
   (d) a plurality of brake means for limiting respective shaft rotation in one direction during normal harrow function and permitting free rotation through an angle in the opposite direction during back-up, said brake means being mounted on each shaft next to said carrier arm horizontal surface, each said brake means having a braking surface contacting said adjacent carrier arm horizontal surface during said normal harrow function;
   (e) said brake means comprises a channel shaped bar having a central horizontal web spanning two vertical flanges;
   (f) said bar vertical flanges have free vertical and horizontal edges forming paired front and rear free corners;
   (g) said rear corners form said braking surface; and
   (h) clamp means for mounting each brake means to said respective shaft.

9. A farm harrow as set forth in claim 8, wherein:
   (a) said bar flange horizontal edges contain aligned notches therein receiving said shaft when said bar is mounted thereon.

10. A farm harrow as set forth in claim 9, wherein:
    (a) said notches are semicircular, matching said shaft periphery.

11. A farm harrow as set forth in claim 8, wherein:
    (a) said paired rear corners are beveled.

12. A farm harrow as set forth in claim 8, wherein:

(a) said clamp means is a U-bolt having threaded free ends;
(b) said U-bolt is positioned around said shaft with said free ends projecting through said bar central web; and
(c) threaded nuts engage said U-bolt free ends urging said bar against said shaft.

13. In a harrow having hollow draw carrier arms and rotatable transverse tooth carrying shafts mounted on said carrier arms, stop means preventing rotation of said shafts with respect to said arms during normal harrow function and permitting rotation of said shafts through an angle in the opposite direction during harrow backup, said stop means comprising:
(a) clamp members engaging said shafts and at least partially contained within said carrier arms and contacting said carrier arms to prevent said rotation during normal harrow function;
(b) said clamp members including release means selectively releasable for permitting angular adjustment of said brake means about said respective shafts.

* * * * *